United States Patent [19]

Mitchell, deceased et al.

[11] Patent Number: 4,808,306

[45] Date of Patent: Feb. 28, 1989

[54] APPARATUS FOR MAGNETICALLY TREATING FLUIDS

[76] Inventors: John Mitchell, deceased, late of Rye, N.Y.; by Charles E. Ament, executor, 33 Pondview Rd., Rye, N.Y. 10580

[21] Appl. No.: 90,943

[22] Filed: Aug. 28, 1987

Related U.S. Application Data

[63] Continuation-in-part of Ser. No. 906,975, Sep. 10, 1986, Pat. No. 4,755,288.

[51] Int. Cl.⁴ .......................... C02F 1/48; F02B 75/10
[52] U.S. Cl. ...................................... 210/222; 123/538
[58] Field of Search .................. 55/100; 123/536, 537, 123/538; 209/223.1, 232; 210/222, 223, 695

[56] References Cited

U.S. PATENT DOCUMENTS

| | | | |
|---|---|---|---|
| 3,349,354 | 10/1967 | Miyata | 210/222 |
| 3,923,660 | 12/1975 | Kottmeier | 210/222 |
| 3,951,807 | 4/1976 | Sanderson | 210/222 |
| 4,146,479 | 3/1979 | Brown | 210/222 |
| 4,216,092 | 8/1980 | Shalhoob et al. | 210/222 |
| 4,265,754 | 5/1981 | Menold | 210/222 |
| 4,278,549 | 7/1981 | Abrams et al. | 210/222 |
| 4,366,053 | 12/1982 | Lindler | 210/222 |
| 4,367,143 | 1/1983 | Carpenter | 210/222 |
| 4,572,145 | 2/1986 | Mitchell et al. | 210/222 |

*Primary Examiner*—W. Gary Jones
*Attorney, Agent, or Firm*—Grimes & Battersby

[57] ABSTRACT

A magnetic force field generator is provided which is adapted to be mounted onto a conduit for treating fluid flowing through the conduit with a magnetic force field of alternating polarity. The generator includes a non-magnetic housing having a longitudinally extending passage for receiving the conduit and a strap device for securing the housing to the conduit. A unitary magnet is provided which is embedded in the housing and is positioned in the same longitudinal plane as the conduit. The magnet has an odd number of sections of alternating polarity, each adapted to generate a discrete magnetic force field in the conduit as the fluid flows therethrough. When the fluid is a fuel, it is preferred that the most upstream section and the most downstream section of the magnet be each adapted to introduce a south polar magnetic field in the inner area of said conduit. When the fluid is water, it is preferred that the most upstream and downstream sections each be adapted to introduce a north polar magnetic field in the inner area of the conduit. In a preferred embodiment, a ferromagnetic plate is mounted in juxtaposition with the magnet for increasing its strength.

19 Claims, 3 Drawing Sheets

APPARATUS FOR MAGNETICALLY TREATING FLUIDS

RELATED APPLICATION

This is a continuation-in-part of U.S. patent application Ser. No. 906,975 filed on Sept. 10, 1986 in the name of Charles E. Ament and John Mitchell (deceased) for APPARATUS AND SYSTEM FOR MAGNETICALLY TREATING FLUID which issued into U.S. Pat. No. 4,755,288 on July 5, 1988.

BACKGROUND OF THE INVENTION

1. Field of the Invention

This invention relates generally to apparatus for magnetically treating fluids and, in particular, such apparatus which may be used for magnetically treating such fluids to increase their efficiency and cleanliness.

2. Description of the Prior Art

It is well known that magnetism has an effect on fluids such as gasoline, diesel fuel, home heating oil and water. For example, U.S. Pat. No. 4,572,145, which issued on Feb. 25, 1986 to the present applicants for Magnetic Fuel Line Device, teaches the use of a magnetic structure which is positioned adjacent a fuel line for creating a magnetic influence on the fuel conveyed therethrough to a fuel consuming apparatus.

Other such patents which relate to the treatment of fluids with magnetism include:

| U.S. Pat. No. | Patentee | Issue Date |
|---|---|---|
| 3,349,354 | Mijata | October 24, 1967 |
| 3,923,660 | Kottmaier | December 2, 1975 |
| 4,146,479 | Brown | March 27, 1979 |
| 4,216,092 | Shalhook et al. | August 5, 1980 |
| 4,265,754 | Minold | May 5, 1981 |
| 4,278,549 | Abrams et al. | July 14, 1981 |
| 4,366,053 | Lindler | December 28, 1982 |

As described in U.S. Pat. No. 4,572,145, when a magnetic field is positioned adjacent to a fuel line, the performance of the engine is improved. It has been found that the improvement in the performance of the engine can be substantially increased when a plurality of multiplicity of magnets of alternating fields are positioned adjacent to the fuel line and the fuel is passed through such alternating fields. Further, improvements in performance have been obtained when a ferromagnetic plate is placed behind the magnets to direct or otherwise concentrate the magnetic forces and, thereby, increase the magnetic field.

SUMMARY OF THE INVENTION

The present invention, in brief summary, comprises a magnetic force field generator which is adapted to be mounted onto a conduit for treating fluid flowing through the conduit with a magnetic force field of alternating polarity. The generator includes a non-magnetic housing having a longitudinally extending passage for receiving the conduit and a strap device for securing the housing to the conduit. A unitary magnetic is provided which is embedded in the housing and is positioned in the same longitudinal plane as the conduit. The magnet has an odd number of sections of alternating polarity, each adapted to generate a discrete magnetic force field in the conduit as the fluid flows therethrough. In one embodiment particularly suitable for use on petroleum based fuels, the most upstream section and the most downstream section of the magnet are each adapted to introduce a south polar magnetic field in the inner area of said conduit. It is understood, however, that the positioning of the North/South fields can be reversed in certain applications. For example, when the generator is used in conjunction with water lines, it has been found that excellent results are obtained when the water is passed through alternating North/South/North magnetic fields, i.e. beginning and ending with the North field. In a preferred embodiment, a ferromagnetic plate is mounted in juxtaposition with the magnet for increasing its strength.

It is therefore an object of the present invention to provide a magnetic field generator adapted to be positioned external of and adjacent to a conduit or fuel line for the transmission of fluids.

It is another object of the present invention to provide such a magnetic field generator which is able to generate a plurality of discrete alternating magnetic fields in said conduit or fuel line.

It is still another object of the present invention to provide such a magnetic field generator in which the discrete alternating magnetic fields are produced by a single magnet having a multiplicity of sections.

It is yet still another object of the present invention to provide such a magnetic field generator which includes means for concentrating the alternating magnetic fields in said conduit.

These and other objects will become apparent from reading the detailed description of the invention with reference to the accompanying drawings.

DETAILED DESCRIPTION OF THE INVENTION

Figure 1:
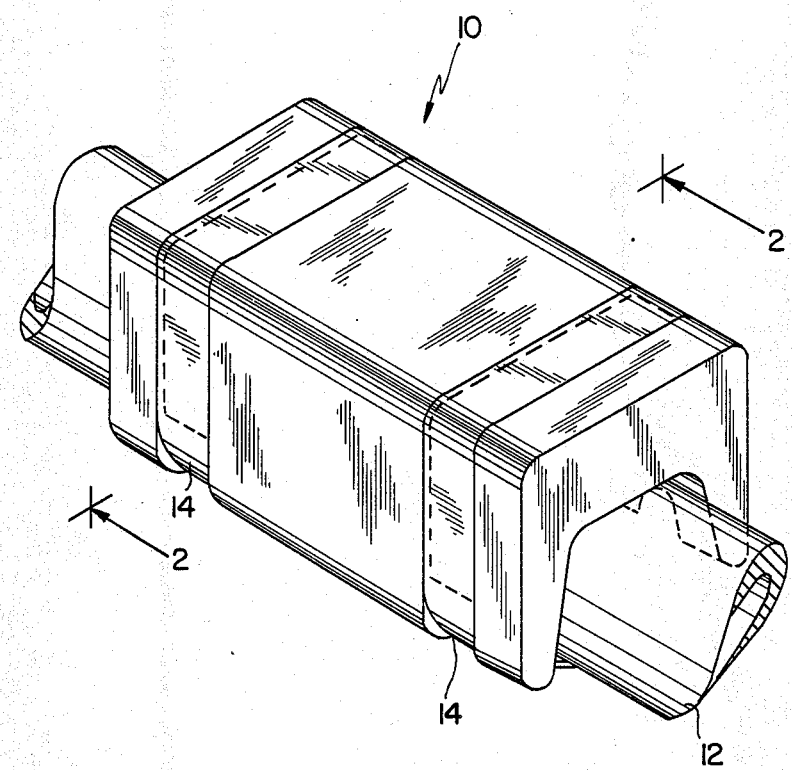
FIG. 1 is a perspective illustration of the multi-magnet magnetic field generator of the present invention positioned adjacent a fluid carrying conduit.

FIG. 1 illustrates the multi-magnet magnetic force field generator of the present invention, referred to generally by reference numeral 10. As shown in FIG. 1, the magnetic field generator 10 is adapted to be mounted adjacent to a conduit 12 or other type of fuel or fluid carrying line and is secured thereon by the use of one or more straps 14 secured by a securing device 16.

The conduit 12 may be a water line or supply line for human or other animal consumption or the water line to a boiler or other water appliance. The conduit 12 can also be the fuel line of a fuel consuming device such as a gasoline engine, diesel engine, oil burner, natural gas or propane burner or the like. The fluid being transmitted through the conduit 12 may be a fuel transmitted from a tank or other storage means (not shown) to a fire or combustion chamber of a fuel consuming apparatus (not shown). The fluid may also be water in a water line of a system or in an apparatus using, heating or cooling water.

Figure 2:
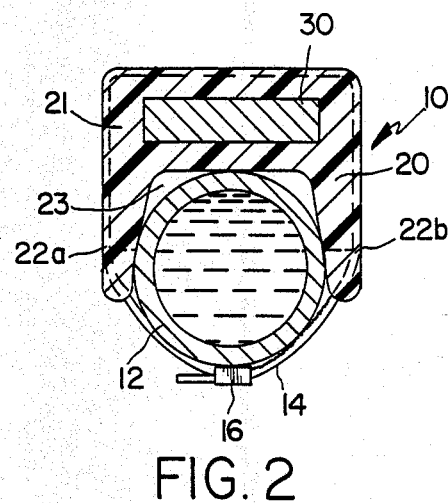
FIG. 2 is a sectional view of the magnetic field generator of FIG. 1 taken across line 2—2.

As shown in greater detail in FIG. 2, the generator 10 has an outer housing 20 fabricated from a non-magnetic material such as a thermoplastic, and includes a body portion 21 with a pair of downwardly extending arm portions 22a and 22b which define a center cavity 23. A bi-pole magnet 30 is mounted in the generator 10. The generator 10 is adapted to be mounted on the conduit 12 which is positioned between the arm portions 22a and 22b and in the center cavity 23.

Figure 3:
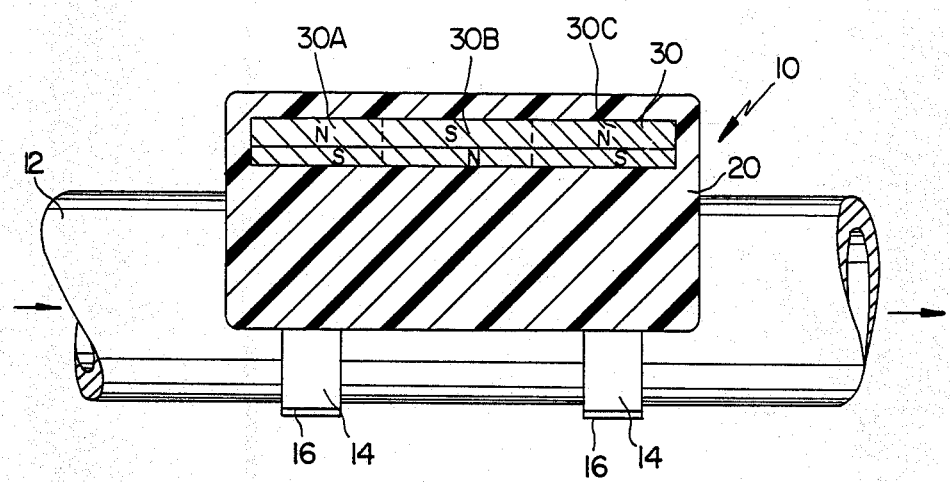
FIG. 3 is a side sectional view of the generator of FIGS. 1 and 2.

As shown in FIG. 3, the bi-pole magnet 30, which is positioned in the same plane as that of the conduit 12, includes a plurality, preferably three, discrete sections 30A, 30B and 30C. The bi-pole magnet 30 must be of sufficient strength to generate a magnetic field in the interior of the conduit 12.

The polarity of each section 30A–30C of the magnet 30 is opposite to the polarity of the adjacent section. For example, as shown in FIG. 3, in the first, most upstream section 30A of the magnet, the south pole S of the magnet is positioned adjacent the conduit 12. In the adjacent second section 30B, the polarity is reversed with the north pole N of the magnet being positioned adjacent the conduit 12. The polarity of the third, most downstream section 30C of the magnet 30 is again reversed, with the south pole S of the magnet 30 being positioned adjacent the conduit 12.

When used in conjunction with fuels, it is preferred that the first, most upstream section 30A of the magnet 30 be oriented such the south pole S is positioned adjacent to the conduit 12. In this manner, the first section 30A serves to generate a south polar magnetic force field in the inner area of the conduit 12. The fluid flowing through the conduit 12 thus passes initially through the south polar magnet field generated by the first section 30A.

The polarity of the second section 30B of the magnet 30, which is positioned downstream of the first section 30A, is opposite that of the first section 30A with its north pole N positioned adjacent the conduit 12 so as to generate a north magnetic force field in the inner area of the conduit 12. As such, the second section 30B serves to generate a north polar magnetic force field in the inner area of the conduit 12.

The third, most downstream section 30B of the magnet 30 is oriented such that its south pole is positioned adjacent the conduit 12. As such, the third section 30B serves to generate a south polar magnet force field within the conduit 12.

As a result of the orientation of the magnet 30 and its sections 30A–30E, the fluid flowing through the conduit 12 is adapted to pass through alternating south/north/south magnetic fields generated by the respective sections of the magnet 30 as it flows downstream through the conduit 12.

Figure 4:
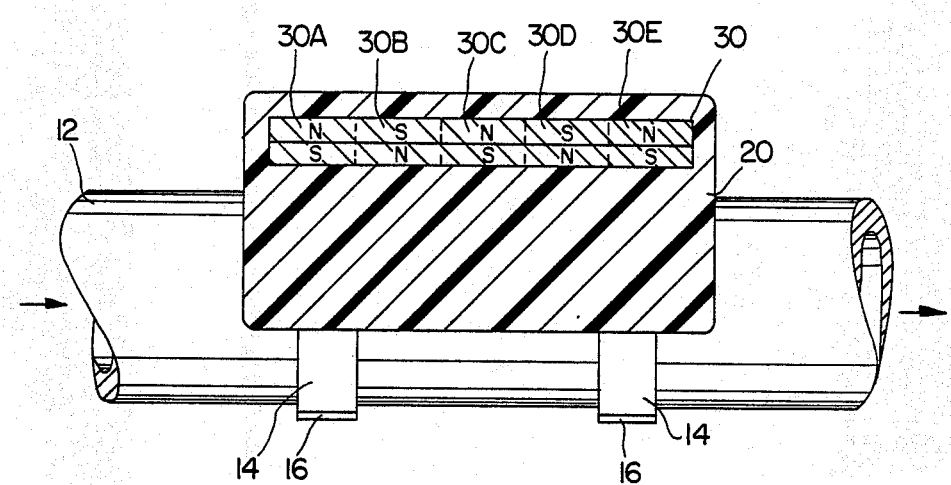
FIG. 4 is a side sectional view of an alternative embodiment of the generator of the present invention.

It will be appreciated that the generator 10 may include any number of sections 30A–30C of the magnet 30. For example, FIG. 4, illustrates an embodiment containing five sections 30A–30E of alternating polarity. It is preferred that the number of sections be an odd number, i.e., three, five, seven, nine, etc., and that the first and last sections be oriented such that their south poles S are positioned adjacent the conduit 12 so as to be able to generate south polar magnetic fields in the conduit 12.

It will be appreciated that when the generator of the present invention is used to treat water or the like, it is best to reverse the positioning of the magnetic poles so as to cause the water to pass through alternating North/South/North fields, i.e., with the first and last magnetic fields being North polar fields.

Figure 5:
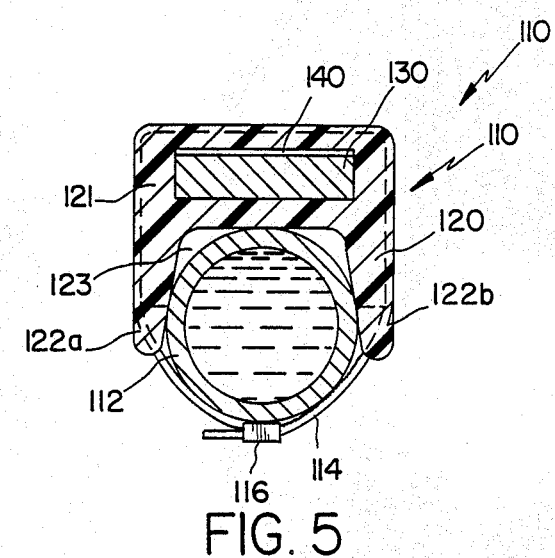
FIG. 5 is a sectional view of another alternative embodiment of the generator of the present invention.
Figure 6:
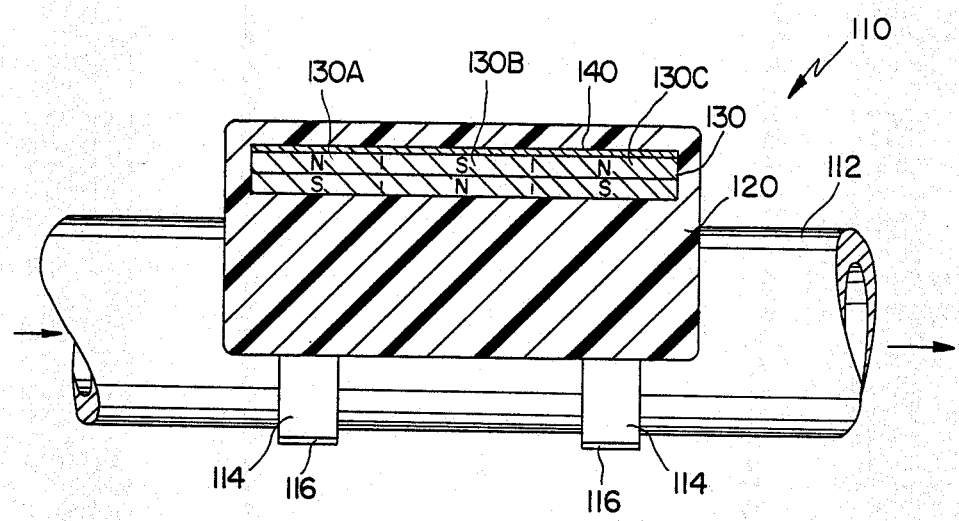
FIG. 6 is a side sectional view of the embodiment of FIG. 5.

FIGS. 5 and 6 illustrate a further embodiment of the generator 110 of the present invention. The generator 110 of this embodiment is adapted to be mounted on a conduit 112 using straps 114 and securing devices 116 in much the same manner with the embodiment of FIGS. 1–4.

A magnet 130 is provided with discrete sections 130A–130C of alternating magnetic polarity. In order to increase the strength of the magnetic field generated by the magnet 30, a backing plate 140 fabricated from a ferromagnetic material is provided on the side of the magnet 30 opposite the conduit 112. It has been found that by positioning the backing plate 140 in juxtaposition with the magnet 30, the magnetic strength of the magnet 30 is substantially increased, thereby increasing the effectiveness of the generator 110. It will be appreciated that with this embodiment, the actual number of discrete sections 130A–130C can also vary. It is preferred, however, that the magnet 30 have an odd number of sections with the first and last sections being oriented such that their south poles S are positioned adjacent the conduit 112 so as to generate a south polar magnetic field in the conduit 112 when the fuel passing therethrough is a fuel.

The magnetic field generators 10, 110 are adapted to be used in conjunction with conduits 12, 112 adapted to convey petroleum based fuels such as gasoline, kerosene and diesel and fuel oil to burners or engines (not shown). In such instances, it has been found that the use of such magnetic field generators to treat such fluid with a magnetic force fields results in substantially reduced consumption of the gasoline or oil required by the burners or engines and lower emissions from combustion.

The magnetic field generators 10, 110 of the present invention may also be used effectively for the treatment of water, particularly to retain the minerals and other particulate matter in suspension. When water containing hardness salts is passed through such a magnetic field force, the electrochemical nature of the ions is changed so that precipitation occurs in a different way than experienced with untreated water. In such an embodiment the sections of the magnet should be aligned such that the first and last sections of the magnet are able to generate a North pole magnetic field in this conduct 112. Crystallization takes place on multiple nuclei in the body of the solution, producing a sludge instead of the precipitate growth on the walls of tubes, heaters, etc., or forming a rock-hard scale which occurs with untreated water. As such, use of the magnetic field generator has been found to be effective for "softening" hard water and for reducing the surface tension of water. In addition, water has been made more palatable to persons for drinking and cooking and surface tension has been reduced increasing the cleaning and solvent properties of water.

The magnetic field generators 10, 110 of the present invention operate in the following manner: fluid flowing through the conduit 12, 112 pass through the alternating discrete magnetic force fields generated by the magnetic generator 10, 110. When this fluid is a fuel, it is preferred that it is first subjected to a south pole magnetic field, then alternately, north and south pole fields. When this fluid is water, it is preferred that it just be subjected to a north pole magnetic field, the alternative South and North pole fields. As the fluid flows through the conduit 12, 112 and passes through the alternating magnetic fields, the fluid is successively subjected to opposing magnetic fields which cause a swirling action in the atomic structure of the fluid causing its atoms to become aligned and thereafter flow in uniform molecular flow.

When the fluid is a petroleum based fuel, friction and ultimate consumption are reduced. The effect of reduced friction permits a better air/fuel mixture thus causing more efficient combustion. Further, it has been found that it results in a cleaner burning engine with a cleaner exhaust. When the fluid is water, drinking water becomes more palatable and, in addition, the particulate matter contained therein tends to remain in suspension or sludge form, thereby minimizing eventual precipitation. The surface tension of the water is also reduced, resulting in increased cleaning and solvent properties.

EXAMPLE 1

In order to demonstrate the effect of using the magnetic field generator of the present invention with an internal combustion engines, a magnetic generator having a magnet with multiple discrete fields was attached to the fuel line of three different motor vehicles and efficiency of each of the vehicles was measured. Improvements of at least 10% were experienced in the fuel consumption for each vehicle which used the magnetic field generator of the present invention.

EXAMPLE 2

Similar tests were run using the magnetic field generator of the present invention on five police cars for a period of over seven (7) months and over a total of 186,324 miles driven. Improvements of between 6% and 16.5% in the amount of fuel consumed per vehicle were experienced.

EXAMPLE 3

Tests were run using the magnetic field generator of the present invention on well water used by humans for consumption, i.e., drinking and cooking, and for home use. After a period of time, use of the generator improved the taste of the water and contributed to its softness.

EXAMPLE 4

Tests were run using the magnetic field generator of the present invention on water having a high iron content. After a six-month period of normal use, the water tanks were inspected and the inside of the tanks were found to be free of rust buildup.

Having thus described the invention with particular reference to the preferred forms thereof, it will be obvious that various changes and modifications may be made therein without departing from the spirit and scope of the invention as defined by the appended claims.

What is claimed is:

1. A magnetic force field generator adapted to be mounted onto a conduit for treating a fluid flowing through said conduit, said generator having a magnetic force field of alternating polarity, said generator including:

a non-magnetic housing having a longitudinally extending passage for receiving said conduit;
means for securing said housing to said conduit; and
a unitary magnet embedded in said housing positioned in the same longitudinal plane as said conduit, said magnet having a plurality of discrete sections with each section having two poles with one pole aligned adjacent said conduit and with the opposite pole aligned remote from said conduit, each section being of a pole and polarity opposite the pole and polarity of each adjacent section, wherein each section is adapted to generate a discrete magnetic force field in said conduit as said fluid flows through said conduit.

2. The generator of claim 1, wherein said magnet includes an odd number of sections.

3. The generator of claim 2, wherein the first, most upstream section of the magnet is oriented relative to the conduit so as to introduce a south polar magnetic field in the inner area of said conduit.

4. The generator of claim 2, wherein the last, most downstream section of the magnet is oriented relative to the conduit so as to introduce a south polar magnetic field in the inner area of said conduit.

5. The generator of claim 2, wherein a second section of the magnet is positioned adjacent the first section and is oriented relative to the conduit so as to introduce a north magnetic field in the inner area of said conduit.

6. The generator of claim 1, wherein said magnet includes at least three sections.

7. The generator of claim 6, wherein said magnet includes three sections.

8. The generator of claim 7, wherein said three sections comprise a first, most upstream section adapted to introduce a south polar magnetic field in the inner area of said conduit, a second section positioned adjacent to and downstream of said first section adapted to introduce a north polar magnetic field in the inner area of said conduit, and a third section positioned adjacent to and downstream of the second section and adapted to introduce a south polar magnetic field in the inner area of said conduit.

9. The generator of claim 6 wherein said at least three sections include a first, most upstream section adapted to introduce a north pole magnetic field in this inner area of said conduit, a second section positioned adjacent to and downstream of said first section adapted to introduce a south polar magnetic field in the inner area of said conduit, and a most downstream third section positioned downstream of the second section and adapted to introduce a north polar magnetic field in the inner area of said conduit.

10. The generator of claim 1, wherein said magnet includes five sections.

11. The generator of claim 1, wherein said means for securing comprises at least one strap device adapted to secure said generator to said conduit.

12. The generator of claim 1, wherein the generator is mounted onto said conduit for treating fluid flowing through said conduit, and wherein the fluid is selected from the group consisting of gasoline, diesel oil, fuel oil, natural gas, propane and water.

13. The generator of claim 1, wherein a ferromagnetic plate is provided in juxtaposition with said magnet to increase the strength thereof.

14. A magnetic force field generator adapted to be mounted onto a conduit for treating a fluid flowing through said conduit, said generator having a magnetic force field of alternating polarity, said generator including:

a non-magnetic housing having a longitudinally extending passage for receiving said conduit;

means for securing said housing to said conduit; and a unitary magnet embedded in said housing positioned in the same longitudinal plane as said conduit, said magnet having an odd number of discrete sections with each section having two poles and with one pole aligned adjacent said conduit and with the opposite pole aligned remote from said conduit, each section being of a pole and polarity opposite the pole and polarity of each adjacent section, and being adapted to generate a discrete magnetic force field in said conduit as said fluid flows through said conduit, wherein the most upstream section and the most downstream section are each adapted to introduce the same polar magnetic field in the inner area of said conduit; and a ferromagnetic plate mounted in juxtaposition with said magnet for increasing the strength thereof.

15. The generator of claim 14, wherein the most upstream and most downstream magnets are each adapted to introduce a south polar magnetic field in the inner area of said conduit.

16. The generator of claim 14, wherein the most upstream and most downstream magnets are each adapted to introduce a north polar magnetic field in the inner area of said conduit.

17. The generator of claim 14, wherein said non-magnetic housing is fabricated from a thermoplastic material.

18. The generator of claim 14, wherein said magnet includes three sections of alternating polarity.

19. The generator of claim 14, wherein said magnet includes an odd number of sections of alternating polarity.

* * * * *